US012644811B2

(12) United States Patent (10) Patent No.: US 12,644,811 B2
Chang et al. (45) Date of Patent: Jun. 2, 2026

(54) FLUID RHEOLOGY MEASUREMENT

(71) Applicant: Saudi Arabian Oil Company, Dhahran (SA)

(72) Inventors: Fakuen Frank Chang, Houston, TX (US); Nan Mai, Richmond, TX (US); Brady Kevin Crane, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 364 days.

(21) Appl. No.: 18/529,384

(22) Filed: Dec. 5, 2023

(65) Prior Publication Data

US 2024/0183767 A1 Jun. 6, 2024

Related U.S. Application Data

(60) Provisional application No. 63/430,587, filed on Dec. 6, 2022.

(51) Int. Cl.
*G01N 11/14* (2006.01)
(52) U.S. Cl.
CPC .................................... *G01N 11/14* (2013.01)
(58) Field of Classification Search
CPC .................................................... G01N 11/14
See application file for complete search history.

(56) References Cited

U.S. PATENT DOCUMENTS

| | | | | |
|---|---|---|---|---|
| 2,553,844 | A | * | 5/1951 | Buchdahl ............... G01N 11/14 |
| | | | | 73/54.28 |
| 6,571,609 | B1 | | 6/2003 | Bi |
| 6,938,464 | B1 | | 9/2005 | Bi |
| 6,951,127 | B1 | | 10/2005 | Bi |
| 10,697,876 | B1 | * | 6/2020 | Jamison ................. G01N 11/14 |
| 2005/0132782 | A1 | * | 6/2005 | Wallevik ............... G01N 11/14 |
| | | | | 73/54.28 |
| 2014/0033803 | A1 | * | 2/2014 | Ozadali ............... B01F 27/1144 |
| | | | | 73/54.28 |

(Continued)

OTHER PUBLICATIONS

A Practical Approach to Rheology and Rheometry, 2nd Edition, Haake, 2004, 291 pages.

(Continued)

*Primary Examiner* — Herbert K Roberts
(74) *Attorney, Agent, or Firm* — Dinsmore & Shol LLP

(57) ABSTRACT

An apparatus includes a rotatable cylindrical housing and sensors. The rotatable cylindrical housing defines a longitudinal axis. The rotatable cylindrical housing is configured to couple to a rotor. The rotor is configured to rotate the rotatable cylindrical housing about the longitudinal axis. Each sensor includes a cylindrical body, a torque sensor, and a shaft that couples the cylindrical body to the torque sensor. The cylindrical bodies of the sensors are disposed within the rotatable cylindrical housing and are space apart along the longitudinal axis. The rotatable cylindrical housing and the cylindrical bodies of the sensors define an annular space for holding a fluid. Each torque sensor of the sensors is configured to, during rotation of the rotatable cylindrical housing, measure a torque applied by the fluid residing in the annular space to the respective cylindrical body to which the torque sensor is coupled via the respective shaft.

18 Claims, 5 Drawing Sheets

(56) References Cited

U.S. PATENT DOCUMENTS

2016/0349163 A1 * 12/2016 Chen ..................... G01N 11/14
2018/0003607 A1 *  1/2018 Gajji ..................... G01N 11/14

OTHER PUBLICATIONS

Moucheront et al., "MRI investigation of granular interface rheology using a new cylinder shear apparatus," Magnetic Resonance Imaging 28(6), Jul. 2010, 910-918, 9 pages.
Shiratori et al., "Rapid rheological characterization of a viscoelastic fluid based on spatiotemporal flow velocimetry," Experimental Thermal and Fluid Science, 71, Feb. 2016, 13 pages.
Turian et al., "Characterization, settling, and rheology of concentrated fine particulate mineral slurries," Powder Technology, Oct. 1997, 93(3), 219-233:15 pages.

* cited by examiner (i)                        (ii)

150

200

PLACE FLUID IN ANNULAR SPACE DEFINED BETWEEN
HOUSING AND CYLINDERS DISPOSED WITHIN HOUSING

_302_

ROTATE HOUSING WHILE CYLINDERS REMAIN NON-ROTATING

_304_

FOR EACH CYLINDER, MEASURE TORQUE APPLIED BY FLUID
IN RESPONSE TO ROTATION OF HOUSING

_306_

_300_

FLUID RHEOLOGY MEASUREMENT

CROSS-REFERENCE TO RELATED APPLICATION(S)

This application claims the benefit of priority to U.S. Provisional Application Ser. No. 63/430,587, filed Dec. 6, 2022, the contents of which are hereby incorporated by reference.

TECHNICAL FIELD

This disclosure relates to measuring rheology of fluids, and in particular, of fluids that carry solids.

BACKGROUND

Hydraulic fracturing (also referred to as fracking, hydrofracturing, or hydrofracking, for example) is a well stimulation technique that involves pumping fluid into a wellbore to form fractures in a formation. Hydraulic fracturing can increase the flow of one or more fluids in a well. Propping agents (also referred to as proppants) can be flowed into the formed fractures to keep apart the fracture surfaces (that is, prop open the fractures), so that fluid can continue to flow through the fractures once the pumping operation of the hydraulic fracturing process ceases. If the proppants settle prematurely, they might not reach deep into the formed fractures and therefore may not perform the desired function of propping open the formed fractures.

SUMMARY

This disclosure describes technologies relating to measuring rheology of solid-carrying fluids. Certain aspects of the subject matter described can be implemented as an apparatus. The apparatus includes a rotatable cylindrical housing and sensors. The rotatable cylindrical housing defines a longitudinal axis. The rotatable cylindrical housing is configured to couple to a rotor. The rotor is configured to rotate the rotatable cylindrical housing about the longitudinal axis. Each sensor includes a cylindrical body, a torque sensor, and a shaft that couples the cylindrical body to the torque sensor. The cylindrical bodies of the sensors are disposed within the rotatable cylindrical housing and are space apart along the longitudinal axis. The rotatable cylindrical housing and the cylindrical bodies of the sensors define an annular space for holding a fluid. Each torque sensor of the sensors is configured to, during rotation of the rotatable cylindrical housing, measure a torque applied by the fluid residing in the annular space to the respective cylindrical body to which the torque sensor is coupled via the respective shaft.

This, and other aspects, can include one or more of the following features. Each torque sensor can be external to the rotatable cylindrical housing. Each shaft can extend from the respective cylindrical body through an opening of the rotatable cylindrical housing to the respective torque sensor. Each sensor can be concentrically aligned along the longitudinal axis. At least one of the shafts can extend through an inner bore of a different one of the shafts. The shafts can be separated from one another by a rotary bearing. Each cylindrical body can have a different outer diameter. The outer diameters of the plurality of cylindrical bodies can have an increasing trend along the longitudinal axis. The fluid can include solid material suspended in a liquid phase.

Certain aspects of the subject matter described can be implemented as a method. A fluid is placed in an annular space defined between a cylindrical housing and cylindrical bodies disposed within the cylindrical housing. The cylindrical housing defines a longitudinal axis. The cylindrical bodies are spaced apart along the longitudinal axis. After placing the fluid in the annular space, the cylindrical housing is rotated while the cylindrical bodies remain non-rotating. For each cylindrical body, a torque applied by the fluid residing in the annular space to the respective cylindrical body is measured in response to rotation of the cylindrical housing.

This, and other aspects, can include one or more of the following features. The cylindrical housing can be rotated by a rotor coupled to the cylindrical housing. Each cylindrical body can be coupled to a respective torque sensor by a respective shaft. Each torque sensor can measure the torque applied by the fluid residing in the annular space to the respective cylindrical body in response to rotation of the cylindrical housing. Each torque sensor can be external to the cylindrical housing. Each shaft can extend from the respective cylindrical body through an opening of the cylindrical housing to the respective torque sensor. Each cylindrical body can be concentrically aligned along the longitudinal axis. At least one of the shafts can extend through an inner bore of a different one of the shafts. The shafts can be separated from one another by a rotary bearing. Each cylindrical body can have a different outer diameter. The fluid can include solid material suspended in a liquid phase.

Certain aspects of the subject matter described can be implemented as a system. The system includes a cylindrical housing, a rotor, and sensors. The cylindrical housing defines a longitudinal axis. The rotor is coupled to the cylindrical housing. The rotor is configured to rotate the cylindrical housing about the longitudinal axis. Each sensor includes a cylindrical body, a torque sensor, and a shaft that couples the cylindrical body to the torque sensor. The cylindrical bodies of the sensors are disposed within the cylindrical housing. The cylindrical bodies of the sensors are space apart along the longitudinal axis. The cylindrical housing and the cylindrical bodies of the sensors define an annular space for holding a fluid. Each torque sensor of the sensors is configured to, during rotation of the cylindrical housing, measure a torque applied by the fluid residing in the annular space to the respective cylindrical body to which the torque sensor is coupled via the respective shaft.

This, and other aspects, can include one or more of the following features. Each torque sensor can be external to the cylindrical housing. Each shaft can extend from the respective cylindrical body through an opening of the cylindrical housing to the respective torque sensor. Each sensor can be concentrically aligned along the longitudinal axis. At least one of the shafts can extend through an inner bore of a different one of the shafts. The shafts can be separated from one another by a rotary bearing. Each cylindrical body can have a different outer diameter. The outer diameters of the plurality of cylindrical bodies can have an increasing trend along the longitudinal axis. The fluid can include solid material suspended in a liquid phase.

The details of one or more implementations of the subject matter of this disclosure are set forth in the accompanying drawings and the description. Other features, aspects, and advantages of the subject matter will become apparent from the description, the drawings, and the claims.

3

Figure 1A:
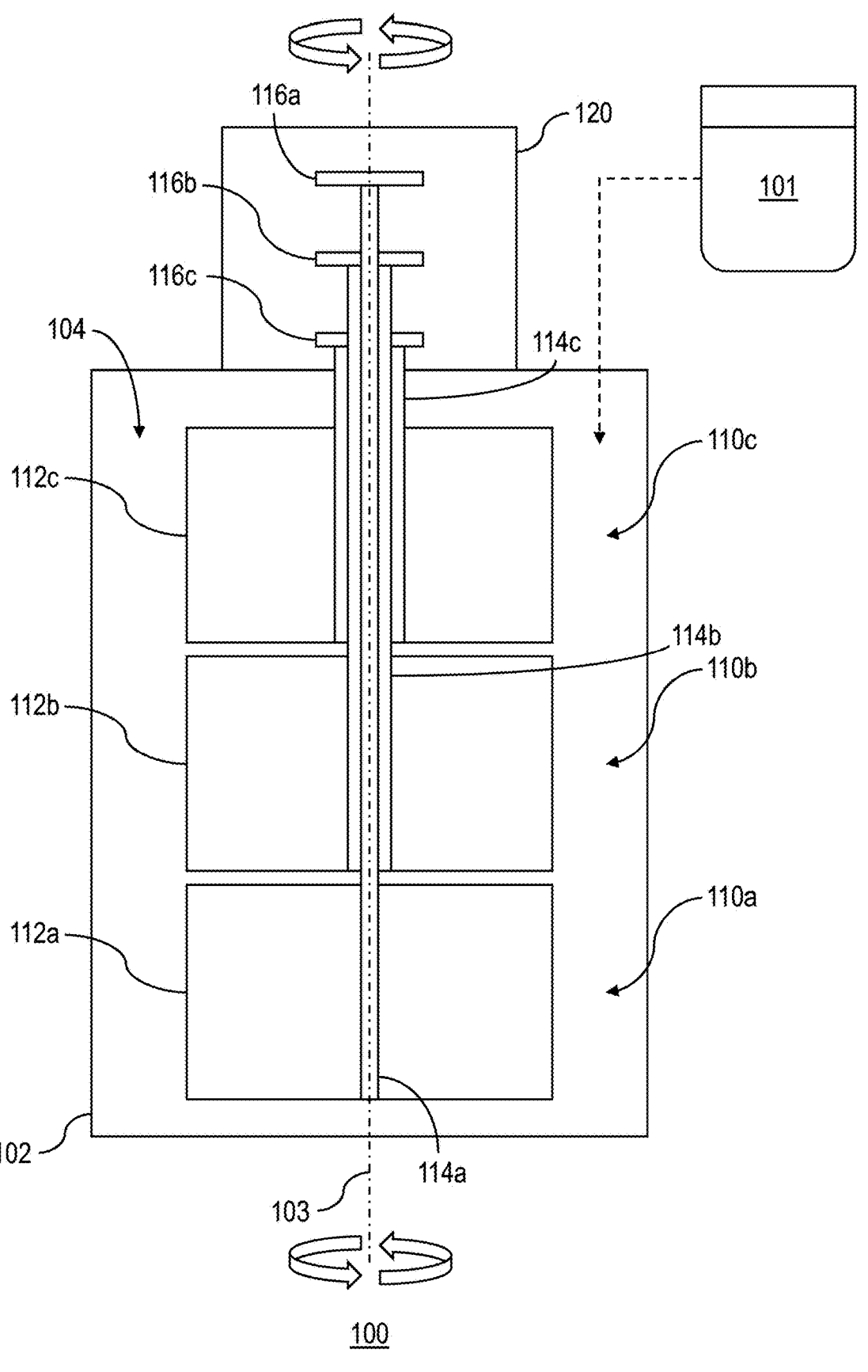
FIG. 1A is a schematic, cross-sectional diagram of an example apparatus for measuring fluid rheology.
Figure 1B:
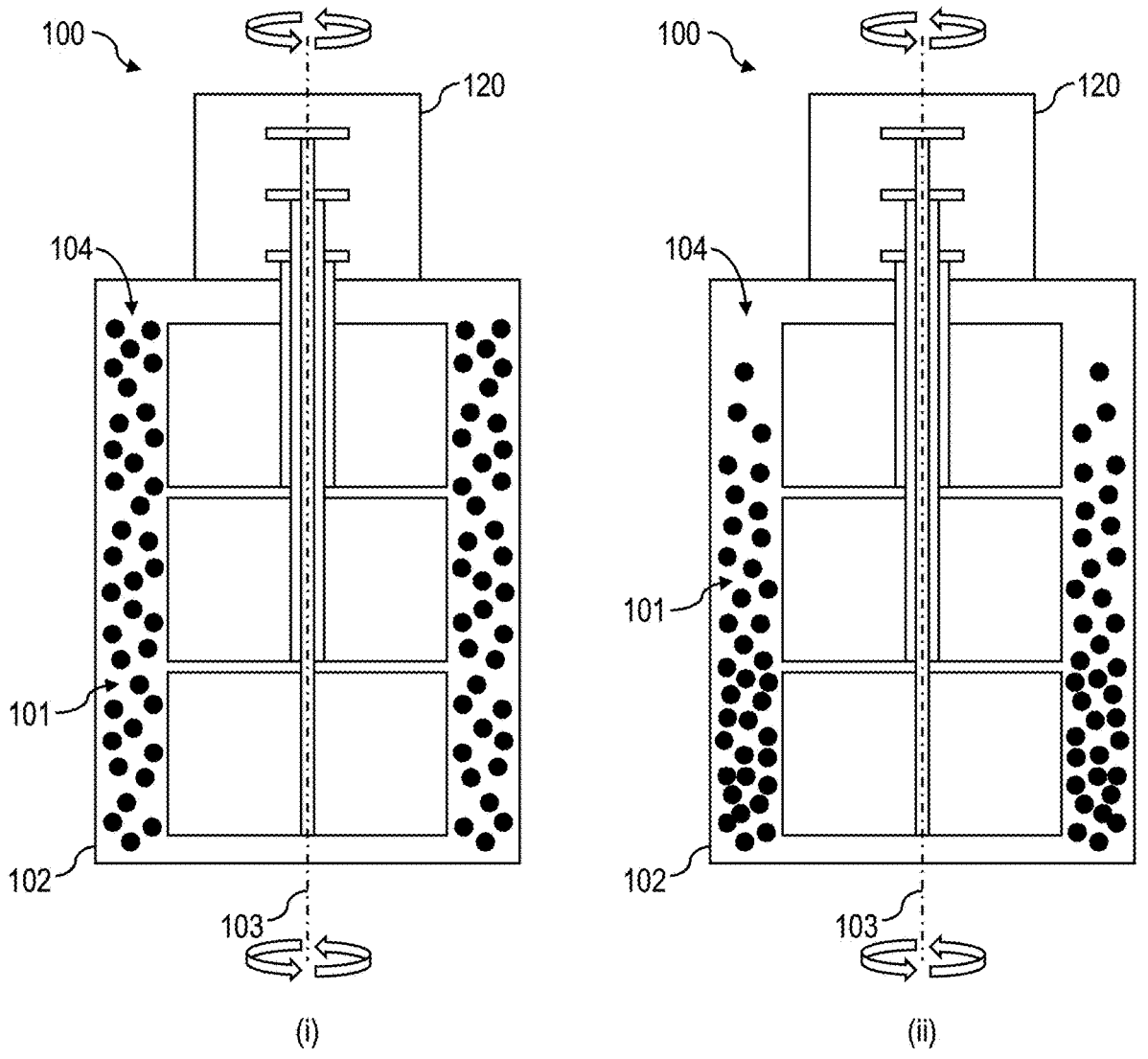

FIG. 1B is a progression of fluid rheology measurement using the apparatus of FIG. 1A.

Figure 1C:
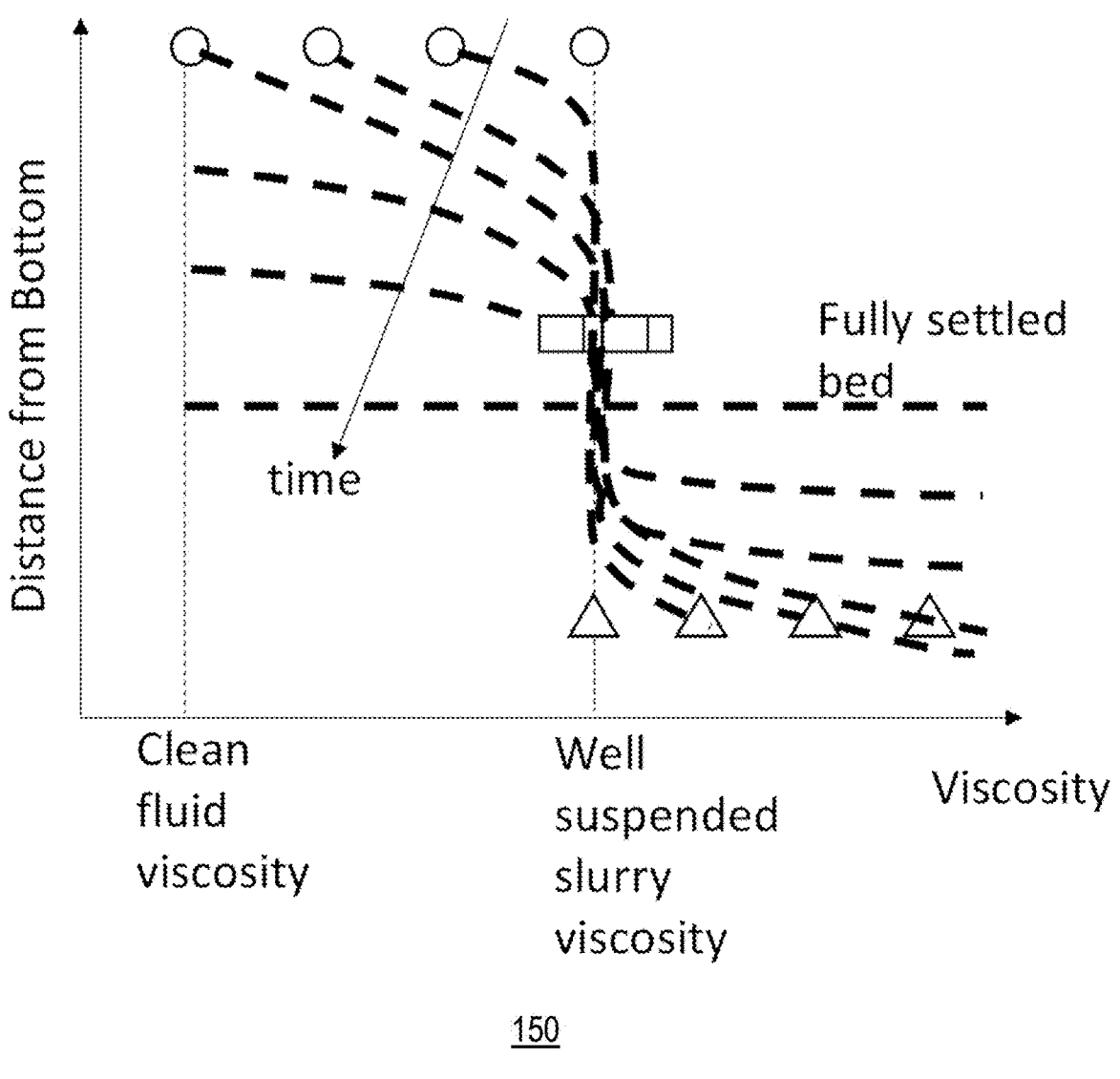

FIG. 1C is a graph showing a viscosity profile of a fluid sample disposed within a rheometer.

Figure 2:
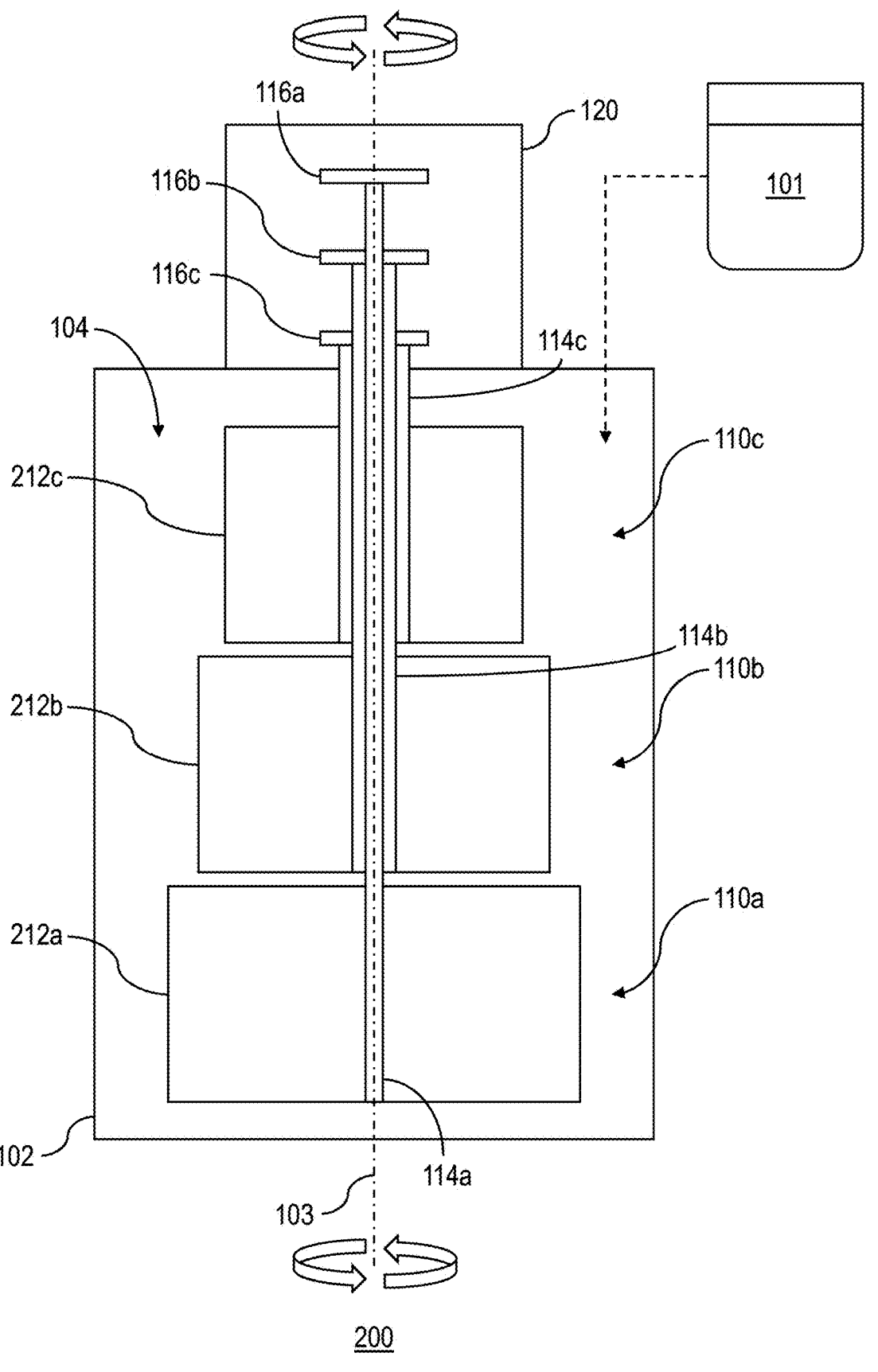

FIG. 2 is a schematic, cross-sectional diagram of an example apparatus for measuring fluid rheology.

Figure 3:
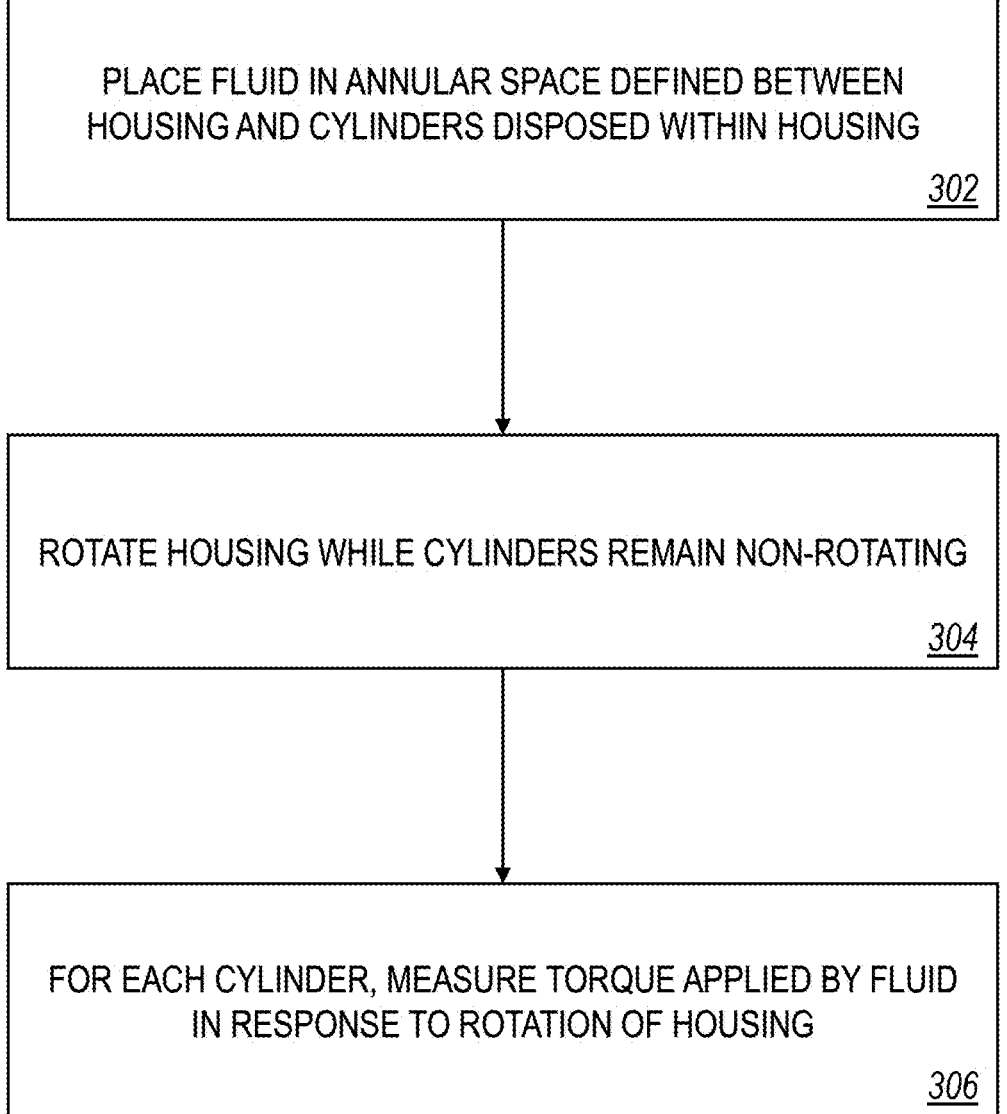

FIG. 3 is a flow chart of an example method for measuring fluid rheology.

DETAILED DESCRIPTION

This disclosure describes measuring rheology of solid-carrying fluids. The apparatus is a rotational rheometer that can be used to simultaneously measure rheology of a fluid (for example, viscosity and viscoelasticity) and settling rate of solids carried by the fluid. The apparatus includes a rotatable cylindrical housing and multiple non-rotating sensors. Each non-rotating sensor includes a cylindrical body that is disposed within the housing. Each cylindrical body is coupled to a torque sensor by a shaft. The fluid being tested can be placed in an annular space defined between the cylindrical bodies and the housing. When the housing is rotated, the fluid residing in the annular space applies a shear force on the cylindrical bodies of the sensors. The shear force on the cylindrical bodies can be measured as torque by the torque sensors. The measured torque can be correlated to viscosity of the fluid. In some cases, the cylindrical bodies have different diameters. Based on the orientation of the apparatus and the effects of gravity, the solids being carried by the fluid may begin to settle. As the solids settle within the housing, the change in solids concentration in the fluid across the profile of the housing can be monitored based on monitoring the viscosity profile of the fluid in the housing.

The subject matter described in this disclosure can be implemented in particular implementations, so as to realize one or more of the following advantages. The apparatuses and methods described can be implemented to simultaneously measure rheology and assess solids settling behavior in a solids-carrying fluid (for example, a fracturing fluid including proppant). The apparatuses and methods described can be implemented to measure rheology and assess solids settling behavior over a wide range of shear conditions and flow regimes (for example, by varying the cylinder diameters disposed within the housing). The apparatuses described can be used frequently and portably, not only in a laboratory setting (for example, for developing new fracturing fluid compositions), but also out in the field (for example, at a wellsite to perform quality assurance and quality check operations for a fracturing fluid that will be injected into a subterranean formation). The apparatuses described can be implemented to assess solids settling behavior more quickly, repeatedly, and cost effectively in comparison to some conventional methods, such as dynamic settling tests. The apparatuses and methods described can be implemented to accurately predict behavior of a fracturing fluid once injected into a subterranean formation, such that excess dosage of expensive chemicals (such as gelling agents, stabilizers, cross-linkers) can be avoided, thereby saving on costs associated with forming the fracturing fluid.

FIG. 1A is a schematic, cross-sectional diagram of an example apparatus 100 for measuring fluid rheology. The apparatus 100 includes a rotatable cylindrical housing 102 and sensors (individual sensors are labeled as reference number 110 followed by a letter for clarity in identification). Although shown in FIG. 1A as including three sensors (110a, 110b, 110c), the apparatus 100 can include fewer sensors (for example, one sensor or two sensors) or additional sensors (such as four sensors, five sensors, or more than five sensors). In some implementations, the apparatus 100 includes from one to ten sensors (for example, one sensor, two sensors, three sensors, four sensors, five sensors, six sensors, seven sensors, eight sensors, nine sensors, or ten sensors). The housing 102 defines a longitudinal axis 103. The housing 102 is configured to couple to a rotor 120 for rotating the housing 102 about the longitudinal axis 103. The rotor 120 can include an electric motor. In some implementations, the rotor 120 includes magnetic coupling. In some implementations, the rotor 120 includes a direct drive belt or chain.

Each sensor (110a, 110b, 110c) includes a cylindrical body, a torque sensor, and a shaft. For clarity in identification, individual cylindrical bodies are labeled as reference number 112 followed by a letter, individual torque sensors are labeled as reference number 114 followed by a letter, and individual shafts are labeled as reference number 116 followed by a letter. For example, first sensor 110a includes first cylindrical body 112a, first torque sensor 114a, and first shaft 116a. As another example, second sensor 110b includes second cylindrical body 112b, second torque sensor 114b, and second shaft 116b. As another example, third sensor 110c includes third cylindrical body 112c, third torque sensor 114c, and third shaft 116c. The shafts (116a, 116b, 116c) couple the cylindrical bodies (112a, 112b, 112c, respectively) to the torque sensors (114a, 114b, 114c, respectively). The cylindrical bodies (112a, 112b, 112c) are disposed within the housing 102. The cylindrical bodies (112a, 112b, 112c) are spaced apart along the longitudinal axis 103. The cylindrical bodies (112a, 112b, 112c) are not in direct physical contact with each other.

The housing 102 and the cylindrical bodies (112a, 112b, 112c) define an annular space 104 for holding a fluid 101. The fluid 101 includes a liquid phase. In some implementations, the fluid 101 includes solid material suspended in the liquid phase. The apparatus 100 can, for example, be used to measure a rheology of the fluid 101. The sensors (110a, 110b, 110c) remain non-rotating while the housing 102 rotates (for example, by the rotor 120). The fluid 101 residing in the annular space 104 applies a shear force on the cylindrical bodies (112a, 112b, 112c), which can be measured as torque by the torque sensors (114a, 114b, 114c). During rotation of the housing 102 (for example, by the rotor 120), each torque sensor (114a, 114b, 114c) is configured to measure a torque applied by the fluid 101 (residing in the annular space 104) to the cylindrical body (112a, 112b, 112c, respectively) to which the torque sensor (114a, 114b, 114c) is coupled by the shaft (116a, 116b, 116c, respectively). Thus, each sensor (110a, 110b, 110c) is configured to individually measure a torque applied by the fluid 101 during rotation of the housing 102. Each torque sensor (114a, 114b, 114c) can, for example, include a mechanical torsion spring or a piezoelectric reaction torque sensor.

In some implementations, as shown in FIG. 1A, each torque sensor (114a, 114b, 114c) is external to the housing 102. In such implementations, each shaft (116a, 116b, 116c) extends from the cylindrical body (112a, 112b, 112c, respectively) through an opening of the housing 102 to the torque sensor (114a, 114b, 114c, respectively). Each sensor (110a, 110b, 110c) can be concentrically aligned along the longitudinal axis 103. In some implementations, as shown in FIG. 1A, at least one of the shafts (116a) extends through an inner bore of a different one of the shafts (116b, 116c). For example, the shafts (116a, 116b, 116c) are in a telescopic arrangement. The first shaft 116a (innermost) can extend through the second shaft 116b (intermediate) and through the third shaft 116c (outermost). The second shaft 116b can extend through the third shaft 116c. In some implementations, the shafts (116a, 116b, 116c) are separated by rotary bearings (for example, ball bearings or fluid bearings). The outermost shaft (116c of the implementation shown in FIG. 1A) can be separated from the housing 102 by a rotary bearing (such as a ball bearing or fluid bearing). The shafts (116a, 116b, 116c) can be prevented from being in direct physical contact with each other and with the housing 102 (even while the housing 102 is rotating). Thus, the sensors (110a, 110b, 110c) can be free of interference from one another, even during the torque measurements.

In some implementations, each cylindrical body (112a, 112b, 112c) has an outer diameter in a range of from about 10 millimeters (mm) to about 49 mm. Although shown in FIG. 1A as having uniform outer diameters, the cylindrical bodies (112a, 112b, 112c) can have varying outer diameters. For example, at least one of the cylindrical bodies (112a, 112b, or 112c) can have an outer diameter that is different from the outer diameters of the remaining cylindrical bodies. As another example, each cylindrical body (112a, 112b, 112c) can have a different outer diameter. As another example, the outer diameters of the cylindrical bodies (112a, 112b, 112c) can have an increasing trend (or a decreasing trend) along the longitudinal axis 103 (an example is shown in FIG. 2). In some implementations, the housing 102 has an inner diameter in a range of from about 15 mm to about 50 mm or from about 20 mm to about 35 mm. In some implementations, for each cylindrical body (112a, 112b, 112c), a difference between the inner diameter of the housing 102 and the outer diameter of the cylindrical body (112a, 112b, 112c) is in a range of from about 0.2 mm to about 40 mm or from about 0.8 mm to about 20 mm.

In some implementations, the cylindrical bodies (112a, 112b, 112c) and the housing 102 are made of the same material. In some implementations, the cylindrical bodies (112a, 112b, 112c) and the housing 102 are made of different materials. In some implementations, the cylindrical bodies (112a, 112b, 112c) are made of steel, aluminum, copper, synthetic solids (such as polycarbonate, polyacrylate, acrylic, plastic, resin, or glass), or any combination of these. In some implementations, the housing 102 is made of steel, aluminum, copper, synthetic solids (such as polycarbonate, polyacrylate, acrylic, plastic, resin, or glass), or any combination of these. In some implementations, the shafts (116a, 116b, 116c) are made of steel, aluminum, copper, synthetic solids (such as polycarbonate, polyacrylate, acrylic, plastic, resin, or glass), or any combination of these.

FIG. 1B is a progression of fluid rheology measurement using the apparatus 100. In the implementation shown in FIG. 1B, the fluid 101 is already placed in the annular space 104 and includes solid material suspended in a liquid phase. At stage (i), the fluid 101 has been recently placed in the annular space 104, and the rotor 120 has begun to rotate the housing 102. At stage (ii), some time has passed since stage (i), and some of the solid material in the fluid 101 has begun to settle near the bottom of the housing 102 due to the orientation of the housing 102 and gravitational effects. As time passes and the solid material settles, the concentration of the solid material increases near the bottom of the housing 102, and the concentration of the solid material decreases near the top of the housing 102. Thus, the annular space 104 has an increasingly varied solid material concentration profile along the longitudinal axis 103 as time goes on. As solid material concentration increases toward the bottom of the housing 102, the effective viscosity of the fluid 101 also increases toward the bottom of the housing 102 due to the increased shear forces. Because the apparatus 100 includes multiple sensors (110a, 110b, 110c) distributed along the longitudinal axis 103 within the housing 102, the apparatus 100 can measure the viscosity profile of the fluid 101 in which the solid material settles near the bottom of the housing 102. Thus, the solid material settling rate and fluid rheology (for example, viscosity and viscoelasticity) of the fluid 101 can be measured by the apparatus 100 simultaneously. The solid material settling rate can be calculated from the distributed solid material bank height as a function of time, which is inferred by the torque measurement profile (proportional to viscosity profile) in the annular space 104 parallel to the longitudinal axis 103.

FIG. 1C is a graph 150 showing a viscosity profile of a fluid sample disposed within a rheometer (for example, the apparatus 100). Initially, the proppant slurry of the fluid sample has a uniform proppant distribution (left portion of graph 150). As time elapsed, the proppants in the proppant slurry began to settle, and the proppant concentration in the lower segment of the fluid column increased as the proppant concentration in the upper segment of the fluid column decreased (middle portion of graph 150). The viscosity profile of the proppant slurry distributed along the vertical profile of the fluid column as a function of time (right portion of graph 150). As can be seen in graph 150, viscosity gradually increased near the bottom of the fluid column while viscosity gradually decreased near the top of the fluid column as the cylindrical housing was rotated and time elapsed.

FIG. 2 is a schematic, cross-sectional diagram of an example apparatus 200 for measuring fluid rheology. The apparatus 200 is substantially similar to the apparatus 100. However, the cylindrical bodies (212a, 212b, 212c) have different outer diameters, in contrast to the cylindrical bodies (112a, 112b, 112c) of the apparatus 100 shown in FIG. 1A which have the same outer diameters. In some implementations, as shown in FIG. 2, the outer diameters of the cylindrical bodies (212a, 212b, 212c) have an increasing trend along the longitudinal axis 103 in the direction from the top to the bottom of the housing 102. Varying the outer diameters of the cylindrical bodies (212a, 212b, 212c) can allow for rheology measurement and solids settling behavior assessment over a wider range of shear conditions and flow regimes in comparison to implementations that include cylindrical bodies of uniform diameter (such as the apparatus 100 shown in FIG. 1A). In some implementations, the differences between the inner diameter of the housing 102 and the outer diameters of each of the cylindrical bodies (212a, 212b, 212c) are in a range of from about 0.2 mm to about 40 mm or from about 0.8 mm to about 20 mm. For example, the difference between the inner diameter of the housing 102 and the outer diameter of the first cylindrical body 212a is in a range of from about 0.2 mm to about 20 mm. As another example, the difference between the inner diameter of the housing 102 and the outer diameter of the second cylindrical body 212b is in a range of from about 0.8 mm to about 20 mm. As another example, the difference between the inner diameter of the housing 102 and the outer diameter of the third cylindrical body 212c is in a range of from about 0.8 mm to about 40 mm.

FIG. 3 is a flow chart of an example method 300 for measuring fluid rheology. Any of the apparatuses 100 or 200 can, for example, implement the method 300. For simplicity and clarity, the method 300 is described in relation to apparatus 100 (although apparatus 200 can optionally be used instead). At block 302, a fluid (such as the fluid 101) is placed in an annular space (such as the annular space 104).

As described previously, the annular space 104 is defined between the housing 102 and the cylindrical bodies (112a, 112b, 112c) disposed within the housing 102. The housing 102 defines the longitudinal axis 103, and the cylindrical bodies (112a, 112b, 112c) are spaced apart along the longitudinal axis 103. After placing the fluid 101 in the annular space 104 at block 302, the housing 102 is rotated (for example, by the rotor 120 coupled to the housing 102) at block 304. The cylindrical bodies (112a, 112b, 112c) remain non-rotating during block 304. Rotating the housing 102 while the cylindrical bodies (112a, 112b, 112c) remain non-rotating at block 304 causes the fluid 101 to apply a shear force on the cylindrical bodies (112a, 112b, 112c). At block 306, a torque applied by the fluid 101 (residing in the annular space 104) to each cylindrical body (112a, 112b, 112c) is measured in response to rotation of the housing 102 at block 304. The shear force applied by the fluid 101 (in response to rotation of the housing 102 at block 304) is measured at block 306 as torque applied to each cylindrical body (112a, 112b, 112c).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

Embodiments

In an example implementation (or aspect), an apparatus comprises: a rotatable cylindrical housing defining a longitudinal axis, the rotatable cylindrical housing configured to couple to a rotor configured to rotate the rotatable cylindrical housing about the longitudinal axis; and a plurality of sensors, each sensor comprising: a cylindrical body; a torque sensor; and a shaft coupling the cylindrical body to the torque sensor, wherein a plurality of the cylindrical bodies of the respective plurality of sensors are disposed within the rotatable cylindrical housing and are spaced apart along the longitudinal axis, wherein the rotatable cylindrical housing and the plurality of cylindrical bodies of the respective plurality of sensors define an annular space for holding a fluid, wherein each torque sensor is configured to, during rotation of the rotatable cylindrical housing, measure a torque applied by the fluid residing in the annular space to the respective cylindrical body to which the torque sensor is coupled via the respective shaft.

In an example implementation (or aspect) combinable with any other example implementation (or aspect), each torque sensor is external to the rotatable cylindrical housing, and each shaft extends from the respective cylindrical body through an opening of the rotatable cylindrical housing to the respective torque sensor.

In an example implementation (or aspect) combinable with any other example implementation (or aspect), each sensor is concentrically aligned along the longitudinal axis.

In an example implementation (or aspect) combinable with any other example implementation (or aspect), at least one of the shafts extend through an inner bore of a different one of the shafts.

In an example implementation (or aspect) combinable with any other example implementation (or aspect), the shafts are separated from one another by a rotary bearing.

In an example implementation (or aspect) combinable with any other example implementation (or aspect), each cylindrical body has a different outer diameter.

In an example implementation (or aspect) combinable with any other example implementation (or aspect), the outer diameters of the plurality of cylindrical bodies have an increasing trend along the longitudinal axis.

In an example implementation (or aspect) combinable with any other example implementation (or aspect), the fluid comprises solid material suspended in a liquid phase.

In an example implementation (or aspect), a method comprises: placing a fluid in an annular space defined between a cylindrical housing and a plurality of cylindrical bodies disposed within the cylindrical housing, wherein the cylindrical housing defines a longitudinal axis, and the plurality of cylindrical bodies are spaced apart along the longitudinal axis; after placing the fluid in the annular space, rotating the cylindrical housing while the plurality of cylindrical bodies remain non-rotating; and for each cylindrical body, measuring a torque applied by the fluid residing in the annular space to the respective cylindrical body in response to rotation of the cylindrical housing.

In an example implementation (or aspect) combinable with any other example implementation (or aspect), the cylindrical housing is rotated by a rotor coupled to the cylindrical housing.

In an example implementation (or aspect) combinable with any other example implementation (or aspect), each cylindrical body is coupled to a respective torque sensor by a respective shaft, and each torque sensor measures the torque applied by the fluid residing in the annular space to the respective cylindrical body in response to rotation of the cylindrical housing.

In an example implementation (or aspect) combinable with any other example implementation (or aspect), each torque sensor is external to the cylindrical housing, and each shaft extends from the respective cylindrical body through an opening of the cylindrical housing to the respective torque sensor.

In an example implementation (or aspect) combinable with any other example implementation (or aspect), each cylindrical body is concentrically aligned along the longitudinal axis.

In an example implementation (or aspect) combinable with any other example implementation (or aspect), at least one of the shafts extend through an inner bore of a different one of the shafts.

In an example implementation (or aspect) combinable with any other example implementation (or aspect), the shafts are separated from one another by a rotary bearing.

In an example implementation (or aspect) combinable with any other example implementation (or aspect), each cylindrical body has a different outer diameter.

In an example implementation (or aspect) combinable with any other example implementation (or aspect), the fluid comprises solid material suspended in a liquid phase.

In an example implementation (or aspect), a system comprises: a cylindrical housing defining a longitudinal axis; a rotor coupled to the cylindrical housing, the rotor configured to rotate the cylindrical housing about the longitudinal axis; and a plurality of sensors, each sensor comprising: a cylindrical body; a torque sensor; and a shaft coupling the cylindrical body to the torque sensor, wherein the plurality of cylindrical bodies of the respective plurality of sensors are disposed within the cylindrical housing and are spaced apart along the longitudinal axis, wherein the cylindrical housing and the plurality of cylindrical bodies of the respective plurality of sensors define an annular space for holding a fluid, wherein each torque sensor is configured to, while the rotor rotates the cylindrical housing about the longitudinal axis, measure a torque applied by the fluid residing in the annular space to the respective cylindrical body to which the torque sensor is coupled via the respective shaft.

In an example implementation (or aspect) combinable with any other example implementation (or aspect), each sensor is concentrically aligned along the longitudinal axis.

In an example implementation (or aspect) combinable with any other example implementation (or aspect), each torque sensor is external to the cylindrical housing.

In an example implementation (or aspect) combinable with any other example implementation (or aspect), each shaft extends from the respective cylindrical body through an opening of the cylindrical housing to the respective torque sensor.

In an example implementation (or aspect) combinable with any other example implementation (or aspect), at least one of the shafts extend through an inner bore of a different one of the shafts.

In an example implementation (or aspect) combinable with any other example implementation (or aspect), each cylindrical body has a different outer diameter, and the fluid comprises solid material suspended in a liquid phase.

What is claimed is:

1. An apparatus comprising:
   a rotatable cylindrical housing defining a longitudinal axis, the rotatable cylindrical housing configured to couple to a rotor configured to rotate the rotatable cylindrical housing about the longitudinal axis; and
   a plurality of sensors, each sensor comprising:
      a cylindrical body;
      a torque sensor; and
      a shaft coupling the cylindrical body to the torque sensor, wherein a plurality of the cylindrical bodies of the respective plurality of sensors are disposed within the rotatable cylindrical housing and are spaced apart along the longitudinal axis, wherein the rotatable cylindrical housing and the plurality of cylindrical bodies of the respective plurality of sensors define an annular space for holding a fluid, wherein each torque sensor is configured to, during rotation of the rotatable cylindrical housing, measure a torque applied by the fluid residing in the annular space to the respective cylindrical body to which the torque sensor is coupled via the respective shaft,
   wherein each cylindrical body has a different outer diameter.

2. The apparatus of claim 1, wherein each torque sensor is external to the rotatable cylindrical housing, and each shaft extends from the respective cylindrical body through an opening of the rotatable cylindrical housing to the respective torque sensor.

3. The apparatus of claim 2, wherein each sensor is concentrically aligned along the longitudinal axis.

4. The apparatus of claim 3, wherein at least one of the shafts extend through an inner bore of a different one of the shafts.

5. The apparatus of claim 4, wherein the shafts are separated from one another by a rotary bearing.

6. The apparatus of claim 1, wherein the outer diameters of the plurality of cylindrical bodies have an increasing trend along the longitudinal axis.

7. The apparatus of claim 6, wherein the fluid comprises solid material suspended in a liquid phase.

8. A method comprising:

placing a fluid in an annular space defined between a cylindrical housing and a plurality of cylindrical bodies disposed within the cylindrical housing, wherein the cylindrical housing defines a longitudinal axis, the plurality of cylindrical bodies are spaced apart along the longitudinal axis, and each cylindrical body has a different outer diameter;

after placing the fluid in the annular space, rotating the cylindrical housing while the plurality of cylindrical bodies remain non-rotating; and for each cylindrical body, measuring a torque applied by the fluid residing in the annular space to the respective cylindrical body in response to rotation of the cylindrical housing.

9. The method of claim 8, wherein the cylindrical housing is rotated by a rotor coupled to the cylindrical housing.

10. The method of claim 9, wherein each cylindrical body is coupled to a respective torque sensor by a respective shaft, and each torque sensor measures the torque applied by the fluid residing in the annular space to the respective cylindrical body in response to rotation of the cylindrical housing.

11. The method of claim 10, wherein each torque sensor is external to the cylindrical housing, and each shaft extends from the respective cylindrical body through an opening of the cylindrical housing to the respective torque sensor.

12. The method of claim 11, wherein each cylindrical body is concentrically aligned along the longitudinal axis.

13. The method of claim 12, wherein at least one of the shafts extend through an inner bore of a different one of the shafts.

14. The method of claim 13, wherein the shafts are separated from one another by a rotary bearing.

15. The method of claim 8, wherein the fluid comprises solid material suspended in a liquid phase.

16. A system comprising:

a cylindrical housing defining a longitudinal axis;

a rotor coupled to the cylindrical housing, the rotor configured to rotate the cylindrical housing about the longitudinal axis; and a plurality of sensors, each sensor comprising:

a cylindrical body;

a torque sensor; and a shaft coupling the cylindrical body to the torque sensor, wherein the plurality of cylindrical bodies of the respective plurality of sensors are disposed within the cylindrical housing and are spaced apart along the longitudinal axis, wherein the cylindrical housing and the plurality of cylindrical bodies of the respective plurality of sensors define an annular space for holding a fluid, wherein each torque sensor is configured to, while the rotor rotates the cylindrical housing about the longitudinal axis, measure a torque applied by the fluid residing in the annular space to the respective cylindrical body to which the torque sensor is coupled via the respective shaft, wherein each cylindrical body has a different outer diameter.

17. The system of claim 16, wherein:

each sensor is concentrically aligned along the longitudinal axis;

each torque sensor is external to the cylindrical housing;

each shaft extends from the respective cylindrical body through an opening of the cylindrical housing to the respective torque sensor, and at least one of the shafts extend through an inner bore of a different one of the shafts.

18. The system of claim 17, wherein the fluid comprises solid material suspended in a liquid phase.

* * * * *